(12) United States Patent
Naito et al.

(10) Patent No.: US 8,390,985 B2
(45) Date of Patent: Mar. 5, 2013

(54) DIELECTRIC CERAMIC AND METHOD FOR PRODUCING DIELECTRIC CERAMIC AND LAMINATED CERAMIC CAPACITOR

(75) Inventors: Masahiro Naito, Kyoto-fu (JP); Seiichi Jono, Fukui-ken (JP); Tomotaka Hirata, Shiga-ken (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 267 days.

(21) Appl. No.: 12/845,055

(22) Filed: Jul. 28, 2010

(65) Prior Publication Data

US 2011/0038096 A1   Feb. 17, 2011

(30) Foreign Application Priority Data

Aug. 12, 2009   (JP) .................................. 2009-187378

(51) Int. Cl.
*H01G 4/06* (2006.01)

(52) U.S. Cl. ...................... 361/321.4; 361/311; 361/313; 361/321.5; 361/321.2; 361/306.1

(58) Field of Classification Search ............... 361/321.4, 361/321.5, 311–313, 301.2, 301.4, 306.1, 361/306.3; 501/134–139
See application file for complete search history.

(56) References Cited

U.S. PATENT DOCUMENTS

| | | | |
|---|---|---|---|
| 6,243,254 B1 * | 6/2001 | Wada et al. ................. | 361/311 |
| 6,335,301 B1 | 1/2002 | Kikuchi et al. | |
| 7,751,176 B2 | 7/2010 | Iguchi et al. | |
| 8,116,065 B2 * | 2/2012 | Nakamura et al. .......... | 361/311 |
| 2007/0161498 A1 | 7/2007 | Takeoka | |
| 2009/0009927 A1 | 1/2009 | Iguchi et al. | |

FOREIGN PATENT DOCUMENTS

| | | |
|---|---|---|
| JP | 03-054161 A | 3/1991 |
| JP | 5-262569 A | 10/1993 |
| JP | 11283860 | 10/1999 |
| JP | 2000103673 A | 4/2000 |
| JP | 2000281440 A | 10/2000 |
| JP | 2002-173368 A | 6/2002 |
| JP | 2006-273643 A | 10/2006 |
| JP | 2007137747 A | 6/2007 |
| JP | 2008-030973 A | 2/2008 |
| JP | 2009016547 A | 1/2009 |

OTHER PUBLICATIONS

Japanese Office Action issued for corresponding application No. JP 2009-187378, date Mar. 6, 2012 with English translation.
Rui Yang; "Preparation and Dielectric Properties of Li-doped $KNbO_3$ Ceramics and Films"; A Dissertation Submitted to China University Of Geosciences for the Degree of Master of Engineering; Chinese Master's Theses Full-text Database, Engineering Science and Technology I, Dec. 15, 2007, No. 6, pp. B015-B061 (Abstract is in English).
Chinese Office Action, issued Jun. 14, 2012, for corresponding Chinese Appl. No. 201010253192.9.

* cited by examiner

*Primary Examiner* — Nguyen T Ha
(74) *Attorney, Agent, or Firm* — Dickstein Shapiro LLP

(57) ABSTRACT

A highly moisture resistant dielectric ceramic is prepared by providing a compact containing a dielectric ceramic component powder and a second powder including a compound containing an alkali metal element, and firing the compact and a second composition containing an alkali metal element at the same time. A laminated ceramic capacitor using the dielectric ceramic is described.

20 Claims, 4 Drawing Sheets

DIELECTRIC CERAMIC AND METHOD FOR PRODUCING DIELECTRIC CERAMIC AND LAMINATED CERAMIC CAPACITOR

BACKGROUND OF THE INVENTION

1. Field of the Invention

The present invention relates to a dielectric ceramic and a method for producing a dielectric ceramic. Furthermore, the present invention relates to a laminated ceramic capacitor using the dielectric ceramic.

2. Description of the Related Art

In recent years, a reduction in size and increase in capacity have been required for laminated ceramic capacitors using a dielectric ceramic. As a result, the thickness for each of the dielectric ceramic layers has been thinner and thinner. Accordingly, higher reliability has been demanded more than ever before.

As a conductive material for internal electrodes for use in laminated ceramic capacitors, copper, which is a relatively inexpensive base metal, has been used in many cases from the standpoint of cost. In the case of using copper for the internal electrodes, it is necessary to fire the ceramic itself at a temperature which is less than the melting point of the copper. Therefore, for example, Japanese Patent Application Laid-Open No. 2000-281440 proposes a dielectric ceramic of a (Ca, Sr)(Zr, Ti)$O_3$ based ceramic with a small amount of alkali metal element added as a sintering aid.

SUMMARY OF THE INVENTION

A laminated ceramic capacitor using a conventionally constructed dielectric ceramic as described in Japanese Patent Application Laid-Open No. 2000-281440 performs well in a moisture resistance loading test, but the insulation resistance degrades after the test period. In other words, degradation occurs after the time period for which the loading test is indicative. In addition, the alkali metal element in the dielectric has the problem of having a small effect as a sintering aid because the alkali metal element scatters during firing.

The present inventor has found, as a result of earnest studies, that firing in an atmosphere of an alkali metal element suppresses the amount of the alkali metal element scattering from a compact. In addition, the present inventor has found that the firing induces segregation of a secondary phase at the surface of the dielectric ceramic to improve the moisture resistance of the dielectric ceramic. The present invention has been achieved in view of the problems described above, and an object of the present invention is to provide a highly moisture resistant dielectric ceramic and a method for producing the dielectric ceramic, as well as a laminated ceramic capacitor using the dielectric ceramic.

A method for producing a dielectric ceramic according to the present invention includes the steps of: preparing a first raw material powder including a powder of a dielectric ceramic component; preparing a second raw material powder including a compound containing an alkali metal element; mixing and then shaping the first raw material powder and the second raw material powder to obtain a compact; and firing the compact and a composition containing an alkali metal element at the same time.

In the present invention, the alkali metal element is prevented from scattering from the compact by firing the compact and the composition containing the alkali metal element at the same time. The fluidity of the sintering aid in the compact is maintained to induce segregation of the secondary phase at the surface of the ceramic. The secondary phase in the vicinity of the surface of the dielectric ceramic serves as a barrier to suppress erosion during a moisture resistance loading test. As a result, it is possible to suppress the characteristic degradation after the moisture resistance loading test.

In the present invention, the dielectric ceramic component is preferably a perovskite type compound represented by the general formula $ABO_3$ (A includes at least one of Ca and Sr, whereas B includes at least one of Zr and Ti). This is because the use of a (Ca, Sr)(Zr, Ti)$O_3$ based ceramic provides a low-loss capacitor in a high frequency region.

In the present invention, the alkali metal element is preferably Li. This is because the case of containing Li as the sintering aid allows a highly reliable ceramic to be obtained, even when copper is used for the internal electrodes.

In the present invention, the composition is preferably a powder containing the alkali metal element. This is because the alkali metal element in the powder scatters during the firing to prevent the alkali metal in the dielectric ceramic from scattering and thus maintains the fluidity of the sintering aid, thereby allowing segregation of the secondary phase.

In the present invention, the composition is preferably a setter containing the alkali metal element. This is because the alkali metal element in the setter scatters during the firing to prevent the alkali metal in the dielectric ceramic from scattering and thus maintains the fluidity of the sintering aid, thereby allowing segregation of the secondary phase.

The present invention is also directed to a dielectric ceramic having a composition containing a main component including a dielectric ceramic component; and an accessory component including an alkali metal element, wherein the dielectric ceramic forms, in the vicinity of a surface thereof, a secondary phase containing the alkali metal element, and the area of the secondary phase containing the alkali metal element is 50% or more in a cross section in the vicinity of the surface of the dielectric ceramic.

When the area of the secondary phase containing the alkali metal element is 50% or more, the secondary phase at the surface of the ceramic serves as a barrier to suppress erosion during a moisture resistance loading test. As a result, it is possible to suppress characteristic degradation after the moisture resistance loading test.

In the present invention, the dielectric ceramic component is preferably a perovskite type compound represented by the general formula $ABO_3$ (A includes at least one of Ca and Sr, whereas B includes at least one of Zr and Ti). This is because the use of the (Ca, Sr)(Zr, Ti)$O_3$ based ceramic provides a low-loss capacitor in a high frequency region.

In the present invention, the alkali metal element is preferably Li. This is because the case of using Li as the sintering aid allows a highly reliable ceramic to be obtained even when copper is used for the internal electrodes.

The present invention is also directed to a laminated ceramic capacitor including a plurality of stacked dielectric ceramic layers, internal electrodes arranged between the plurality of dielectric ceramic layers, and external electrodes electrically connected to the internal electrodes, wherein the dielectric ceramic layers are formed of the dielectric ceramic according to the present invention.

In this case, a laminated ceramic capacitor can be obtained which has excellent feature, namely small size and large capacity, and high reliability.

In the present invention, the compact and the composition containing the alkali metal element are fired at the same time, thereby preventing the alkali metal element from scattering from the compact, and resulting in segregation of the secondary phase on the surface of the ceramic. As a result, it is possible to suppress the characteristic degradation after a moisture resistance loading test.

DETAILED DESCRIPTION OF THE INVENTION

Figure 1:
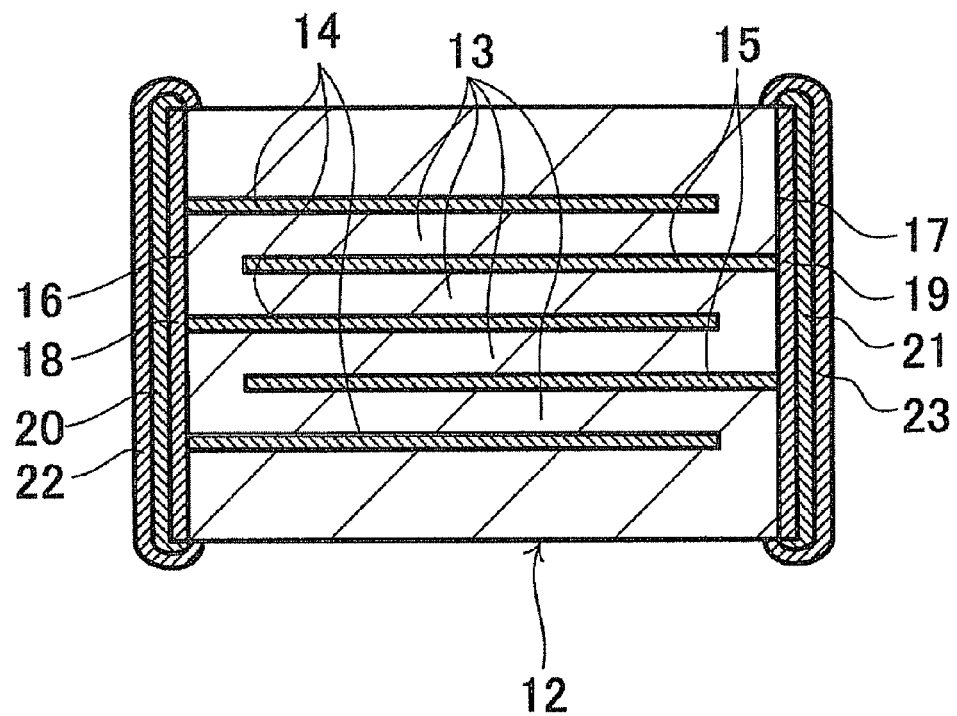
FIG. 1 is a cross-sectional view of a laminated ceramic capacitor according to the present invention.

First, a laminated ceramic capacitor, which is a major application of a dielectric ceramic according to the present invention will be described. FIG. 1 is a cross-sectional view of a laminated ceramic capacitor 11 according to an embodiment of the present invention.

The laminated ceramic capacitor 11 includes a laminate 12. The laminate 12 includes a plurality of stacked dielectric ceramic layers 13 and a plurality of internal electrodes 14 and 15 formed along the interfaces between the plurality of dielectric ceramic layers 13. The internal electrodes 14 and 15 are formed so as to reach the outer surface of the laminate 12. The internal electrodes 14 are drawn to one end surface 16 of the ceramic laminate 12. In addition, the internal electrodes 15 are drawn to the other end surface 17 of the ceramic laminate 12. Furthermore, the internal electrodes 14 and 15 are arranged alternately within the ceramic laminate 12 so that a capacitance can be acquired via the dielectric ceramic layers 13.

The conductive material for the internal electrodes 14 and 15 is preferably nickel or nickel alloys in addition to low-cost copper or copper alloys.

In order to extract the capacitance described above, external electrodes 18 and 19 are respectively formed on the end surfaces 16 and 17 of the outer surface of the ceramic laminate 12, so as to be electrically connected to specific ones of the internal electrodes 14 and 15. As the conductive material contained in the external electrodes 18 and 19, the same conductive material as in the case of the internal electrodes 14 and 15 can be used. Furthermore, silver, palladium, silver-palladium alloys, etc, can be used as the conductive material.

In addition, if necessary, first plating layers 20 and 21 composed of nickel, copper, or the like are respectively formed on the external electrodes 18 and 19. Further, second plating layers 22 and 23 composed of solder, tin, or the like are formed thereon respectively.

Next, a method for producing the laminated ceramic capacitor 11 will be described.

First, a first raw material powder including a powder of a dielectric ceramic component is prepared.

To that end, a compound containing at least one of Ca and Sr, such as a carbonate, and a compound containing at least one of Ti and Zr, such as an oxide, are first prepared. Then, the compounds are mixed in a desirable ratio, calcined in the atmosphere to cause a reaction, and ground to obtain the first raw material powder.

Next, a second raw material powder including a compound containing an alkali metal element is prepared in the same way.

As the forms of the starting materials for obtaining the first raw material powder and the second raw material powder, nitrates, hydroxides, organic acid salts, alkoxides, chelate compounds, etc., can be appropriately used depending on embodiments of the synthesis reaction, in addition to the oxide and carbonate mentioned above.

wet type methods such as a hydrothermal synthesis method, a co-precipitation method, and an alkaline hydrolysis method can be used as the method for obtaining the first raw material powder and the second raw material powder in addition to the method of calcining the mixed powder described above.

Then, the first raw material powder and the second raw material powder are mixed, and shaped to obtain a compact.

First, an organic binder and a solvent are added to the first raw material powder and the second raw material powder, followed by mixing, thereby producing a slurry. This slurry is used to produce ceramic green sheets to serve as the dielectric ceramic layers 13.

Next, a conductive paste film to serve as the internal electrodes 14 and 15 is formed on the specific ceramic green sheets. This conductive paste film is preferably a base metal such as copper or copper alloys or nickel or nickel alloys. The conductive paste film is formed by, for example, a deposition method or the like, in addition to screen printing.

Multiple ceramic green sheets each with the conductive paste film and multiple ceramic green sheets with no conductive paste film are appropriately stacked, subjected to pressure bonding, and then cut if necessary, thereby obtaining a compact to serve as the laminate 12. The conductive paste films in this compact have end edges exposed to either end surface.

Next, a composition containing an alkali metal element is prepared. Examples of the composition include a powder containing an alkali metal element and a setter containing an alkali metal element.

The obtained compact is then fired. In the present invention, the composition containing the alkali metal element is placed around the compact. Then, the compact and the composition containing the alkali metal element are fired at the same time. The alkali metal element contained in the composition is released during the firing to bring the environment of the compact into an atmosphere of the alkali metal element. Therefore, the alkali metal element included in the compact can be prevented from scattering.

The compact is fired, thereby obtaining the laminate 12 as shown in FIG. 1. In the laminate 12, the ceramic green sheets described above constitute the dielectric ceramic layers 13, whereas the conductive paste films constitute the internal electrodes 14 or 15.

Then, the external electrodes 18 and 19 are respectively formed on the end surfaces 16 and 17 of the laminate 12, so as to be electrically connected to the respective exposed end edges of the internal electrodes 14 and 15. The external electrodes 18 and 19 are typically formed by applying a paste containing the conductive metal powder described above to the outer surface of the fired laminate 12 and firing the paste. Alternatively, the external electrodes 18 and 19 may be formed by applying the paste on the outer surface of the compact and firing the paste at the same time as the firing for obtaining the laminate 12.

After that, the external electrodes 18 and 19 are plated with nickel, copper, or the like to form the first plating layers 20 and 21. The first plating layers 20 and 21 are then plated with solder, tin, or the like to form the second plating layers 22 and 23.

The laminated ceramic capacitor 11 is thus completed.

It is to be noted that while there is a possibility that impurities such as Al, Zr, Fe, Hf, and N are incorporated in either the step of producing the raw material powder for the dielectric ceramic or the other steps for producing the laminated ceramic capacitor 11, the incorporation of these impurities will cause no problems in the electrical properties of the laminated ceramic capacitor 11.

The dielectric ceramic in the laminated ceramic capacitor 11 has a composition containing a main component including a dielectric ceramic component and an accessory component including an alkali metal element. The dielectric ceramic component is preferably a perovskite type compound represented by the general formula $ABO_3$ (A includes at least one of Ca and Sr, whereas B includes at least one of Zr and Ti).

In the dielectric ceramic obtained in accordance with such a firing method, a secondary phase containing the alkali metal element is formed in the vicinity of the surface of the dielectric ceramic. Furthermore, the area of the secondary phase containing the alkali metal element is 50% or more when a cross section is observed in the vicinity of the surface of the dielectric ceramic.

The secondary phase is formed in the vicinity of the surface of the dielectric ceramic. The vicinity of the surface refers to a region from the surface of the dielectric ceramic toward the inside by a 1% distance of the total thickness of the laminated ceramic capacitor.

The dispersion of the alkali metal element can be confirmed by TOF-SIMS (time-of-flight secondary ion mass spectrometer). At the same time, the position in which the secondary phase is present is confirmed with a reflected electron image from a SEM. These results can be checked with each other to specify the position in which the secondary phase containing the alkali metal element is present, thereby calculating the area with respect to the entire field of view.

Experimental Example 1

In this experimental example, a laminated ceramic capacitor using a dielectric ceramic was produced.

First, a first raw material powder including a powder containing a dielectric ceramic component was prepared. Specifically, $CaCO_3$, $SrCO_3$, $BaCO_3$, $TiO_2$, and $ZrO_2$ of 99% or more in purity were prepared. Then, the $CaCO_3$, $SrCO_3$, $BaCO_3$, $TiO_2$, and $ZrO_2$ were weighed so as to provide a predetermined composition, mixed in a ball mill in a wet manner, dried, and ground. Then, this powder was calcined at 1000 to 1200° C. in the atmosphere and then ground to obtain the first raw material.

Next, a second raw material powder including a glass containing an alkali metal element was prepared. Specifically, $SiO_2$, $MnCO_3$, and Si—B-A-AE based glass (A: at least one of Li, Na, and K; AE: at least one of Mg, Ca, Sr, and Ba) were prepared. The Si—B-A-AE based glass was obtained by mixing $SiO_2$, $B_2O_3$, $Li_2CO_3$, $Na_2CO_3$, $K_2CO_3$, $SrCO_3$, $CaCO_3$, $BaCO_3$, and $MgCO_3$ of 99% or more in purity, followed by heating to 1000° C. in the atmosphere, then rapid cooling, and grinding.

Then, the first raw material powder and the second raw material powder were mixed. Specifically, the first raw material powder and the second raw material powder were weighed so as to result in 100 $(Ca_{0.95}Sr_{0.05})_{1.000}$ $(Zr_{0.94}Ti_{0.05}Hf_{0.01})O_3$+10.0 Mn+5.0 Si, then mixed in a ball mill in a wet manner, and then dried and ground. It is to be noted that the amount of glass added was adjusted to an amount of 5.0 wt % with respect to the weight in the mixture other than the glass.

Then, a polyvinyl butyral based binder and an organic solvent such as toluene or ethanol was added to the mixed first raw material powder and second raw material powder, followed by wet mixing in a ball mill, thereby preparing a slurry. This slurry was used to form ceramic green sheets. Then, a conductive paste film containing copper as its main component was formed by screen printing onto the ceramic green sheets. Multiple ceramic green sheets each with the conductive paste film and multiple ceramic green sheets with no conductive paste film were stacked, subjected to pressure bonding, and then cut to obtain compacts.

The compacts were then heated at a temperature of 200° C. to 800° C. to burn off the binder, and then fired at 950° C. to 1000° C., thereby obtaining a laminate.

Next, the laminate was subjected to barrel processing to expose the internal electrodes at the end surfaces. A copper paste to serve as external electrodes was then applied. After drying the copper paste, the external electrodes were fired at 700 to 900° C. in a neutral or reducing atmosphere.

Subsequently, Ni plating layers were formed on the external electrodes by barrel plating. Then, Sn plating layers were formed in the same way.

The laminated ceramic capacitor thus obtained has outer dimensions of 0.3 mm in width, 0.6 mm in length, and 0.3 mm in thickness. In addition, the dielectric ceramic layers have a thickness of 3 μm per layer. In addition, the number of the effective dielectric ceramic layers is 10.

In this experimental example, samples were produced under conditions 1 to 8 in accordance with the firing temperature, the setting mode, and the presence or absence of the composition. The experimental conditions and the results are shown in Table 1.

Figure 2A:
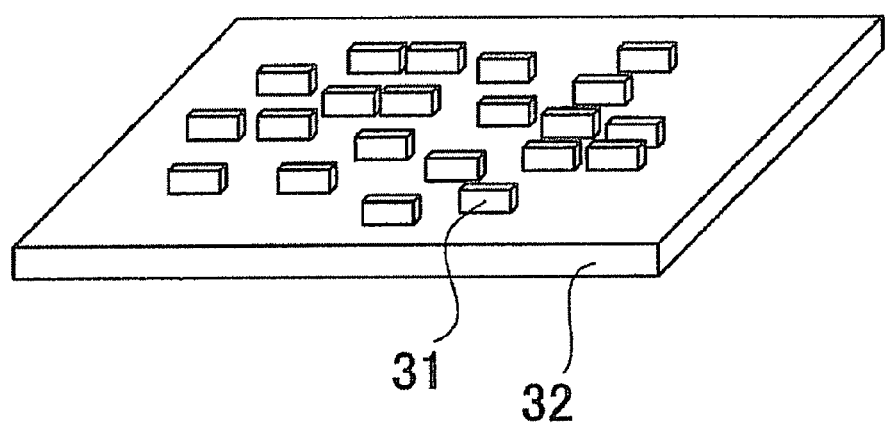
FIG. 2 is a diagram of setting modes.
Figure 2B:
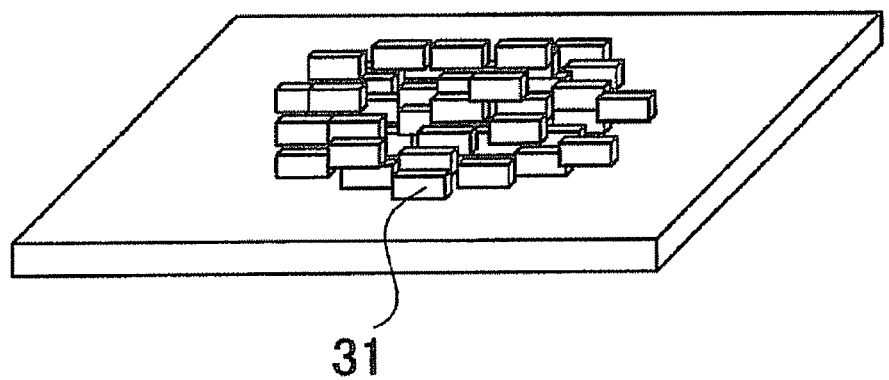

The setting mode for compacts in the firing was as shown in FIG. 2. FIG. 2A is a diagram of a discrete mode. In the discrete mode, all of compacts 31 in contact with a setter 32 are arranged so as not to sandwich any other compact between the compacts 31 and the setter 32. FIG. 2B is a diagram of a pile mode. In the pile mode, the compacts 31 are arranged on top of each other. As the setter, a setter of about 50 mm×50 mm was used. About 500 to 750 compacts were arranged in the case of the discrete mode. In the case of the pile mode, about 2000 to 3000 compacts were arranged.

Figure 3A:
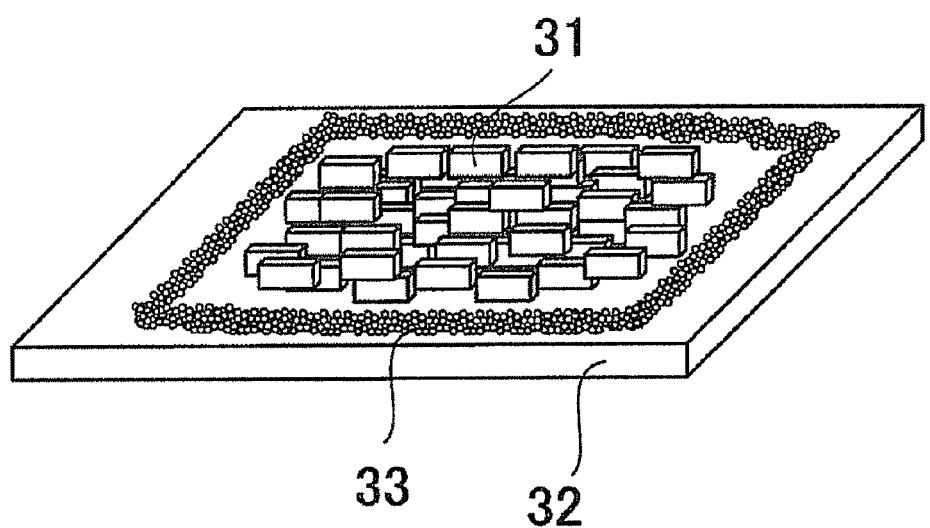
FIG. 3 is a diagram of compositions according to the present invention.
Figure 3B:
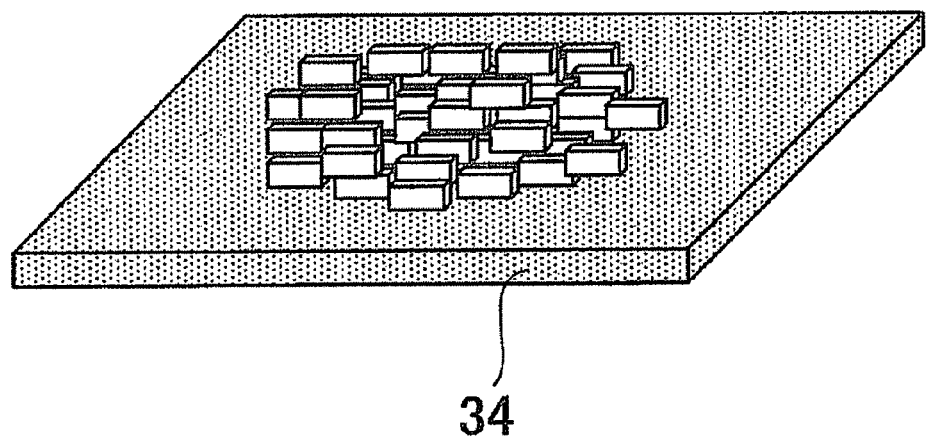

FIG. 3A is an example of placing, as a composition, a powder 33 containing an alkali metal element on the setter 32. The powder 33 is placed to surround compacts 31 on a setter 32. In the present experimental example, about 3 to 5 g of oxide powder of $Li_2CO_3$ was placed around the compacts. FIG. 3B is an example of a setter containing an alkali metal element as a composition. Setter 34 contains Li therein. In the present experimental example, a setter was impregnated with an about 1.0 wt % $Li_2CO_3$ solution to produce the containing setter 34.

After firing the laminated ceramic capacitors under the conditions in Table 1, two types of measurements were carried out.

First, the area of a secondary phase containing an alkali metal element in the vicinity of the surface was calculated as follows.

First, the laminated ceramic capacitors were polished so that the cross section of the dielectric ceramic layers appeared. Then, the dispersion of the alkali metal element was confirmed by TOF-SIMS analysis. Prior to the analysis, Bi ion irradiation removed contamination on the surface. It is to be noted that the analysis conditions were the use of $Bi_3^{2+}$ as a primary ion for the irradiation and a primary ion accelerating voltage of 25 kV. Further, the buncher voltage was set at 0 V during the measurement of an ion image and 2210 V during the measurement of a mass spectrum.

At the same time, the secondary phase was observed with a reflected electron image from a SEM. Then, the observation was brought together with the result of the TOF-SIMS analysis to specify the position of the secondary phase containing the alkali metal element. Then, the area ratio of the secondary phase containing the alkali metal with respect to the entire field of view was calculated in a cross section in the vicinity of the surface of the dielectric ceramic. A field of view of 2 μm×2 μm was employed.

Secondly, an accelerating moisture resistance loading test (Pressure Cooker Bias Test: PCBT) was carried out for the laminated ceramic capacitors obtained. The test conditions were a temperature of 121° C., a humidity of 100% RH, an atmospheric pressure of 2 atm, an applied voltage of 50 V, and the number of samples of 72. The number of samples with their insulation resistance values decreased to $10^6 \Omega$ or less after a lapse of 1000 hours was counted as the number of degraded samples.

phase of glass was formed at the surfaces of the compacts. As a result, moisture intrusion into grain boundaries occurred during the PCBT test, and 68 samples among the 72 samples were degraded in terms of insulating resistance.

Under the conditions 6 and 7, the Li atmosphere for the firing was formed more than under the condition 8, thereby forming a secondary phase. However, samples degraded in terms of insulating resistance were also generated because of the insufficient Li atmosphere.

Experimental Example 2

In Experimental Example 2, a laminated ceramic capacitor was produced from a dielectric ceramic containing a Ba—Nd—Ti—O based dielectric ceramic component as a main component.

First, a first raw material powder including a powder containing a dielectric ceramic component was prepared. Spe-

TABLE 1

| Condition No. | Calcination Temperature | Setting mode | Composition | Area Ratio of Secondary Phase containing Alkali Metal with respect to Entire Field of View | The Number of Degraded Samples after Test |
|---|---|---|---|---|---|
| Condition 1 | 1000° C. | Pile Mode | Powder | 85.5% | 0/72 |
| Condition 2 | 980° C. | Pile Mode | Powder | 80.1% | 0/72 |
| Condition 3 | 950° C. | Discrete Mode | Powder | 64.6% | 0/72 |
| Condition 4 | 1000° C. | Pile Mode | Containing Setter | 56.0% | 0/72 |
| Condition 5 | 950° C. | Discrete Mode | Containing Setter | 52.6% | 0/72 |
| Condition 6* | 950° C. | Pile Mode | — | 48.9% | 3/72 |
| Condition 7* | 1000° C. | Pile Mode | — | 42.1% | 11/72 |
| Condition 8* | 950° C. | Discrete Mode | — | 12.5% | 68/72 |

*Outside the Scope of the Present Invention

It is determined from Table 1 that the area ratio of the secondary phase containing Li in the cross section of the dielectric ceramic is 50% or more in the case of the conditions 1 to 5 for firing together with the composition containing Li. In addition, it is determined that no sample degraded in terms of insulation resistance was generated after the PCBT test.

Figure 4:
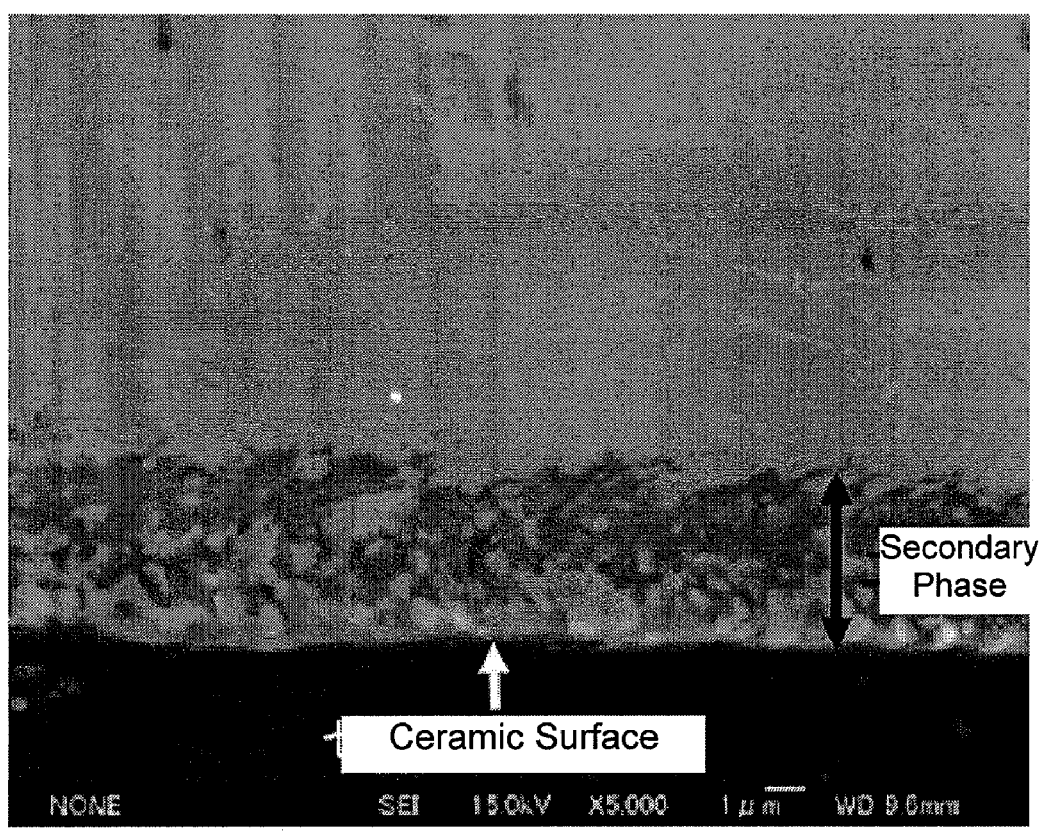
FIG. 4 is a SEM photograph of a dielectric ceramic according to the present invention (Experimental Example 1).

FIG. 4 shows a SEM photograph of a section of the laminate in accordance with the condition 2. It is determined that a secondary phase is formed in the vicinity of the surface of the dielectric ceramic.

On the other hand, under the conditions 6 to 8 without firing in the presence of the composition containing the alkali metal element, samples degraded in terms of insulating resistance were generated after the PCBT.

Under the condition 8, the compacts were placed in the discrete mode, and a Li atmosphere was not really formed. Thus, Li was released from the glass in the compacts. This release increased the viscosity of the glass to make it harder for the glass to flow during the firing, and thus, no secondary cifically, 99% or more purity $BaCO_3$, $TiO_2$, and $Nd_2O_3$ were prepared. Then, the first raw material powder was obtained in the same way as in Experimental Example 1.

Next, a second raw material powder including glass containing an alkali metal element was prepared. Specifically, $MnCO_3$, and Si—B-A-AE based glass were prepared.

Then, the first raw material powder and the second raw material powder were weighed so as to result in 5.0 BaO-25.0 $Nd_2O_3$-70.0 $TiO_2$+5.0 Mn), followed by preparation of a slurry in the same way as in Experimental Example 1. The amount of Si—B-A-AE based glass added was adjusted to a ratio of 10.0 wt % with respect to the weight other than the glass.

After that, a sample in accordance with condition 9 was produced in the same way as in Experimental Example 1. Then, the sample in accordance with the condition 9 was evaluated in the same way as in Experimental Example 1. The experimental condition and results are shown in Table 2.

TABLE 2

| Condition No. | Calcination Temperature | Setting mode | Composition | Area Ratio of Secondary Phase containing Alkali Metal with respect to Entire Field of View | The Number of Degraded Samples after Test |
|---|---|---|---|---|---|
| Condition 9 | 980° C. | Pile Mode | Powder | 87.7% | 0/72 |

It is determined from Table 2 that the area ratio of the secondary phase containing Li in the cross section of the dielectric ceramic is 87.7% in the case of the condition 9, i.e., firing together with the composition containing Li. In addition, it is determined that no sample degraded in terms of insulation resistance was generated after the PCBT test.

Experimental Example 3

In Experimental Example 3, a laminated ceramic capacitor was produced from a dielectric ceramic containing a $Mg_2SiO_4$ based dielectric ceramic component as a main component.

First, a first raw material powder including a powder containing a dielectric ceramic component was prepared. Specifically, 99% or more purity $BaCO_3$ and $SiO_2$ were prepared. Then, the first raw material powder was obtained in the same way as in Experimental Example 1.

Next, a second raw material powder including glass containing an alkali metal element was prepared. Specifically, Si—B-A-AE based glass was prepared.

Then, the first raw material powder and the second raw material powder were weighed so as to result in $Mg_2SiO_4$, followed by preparation of a slurry in the same way as in Experimental Example 1. The amount of Si—B-A-AE based glass added was adjusted to a ratio of 10.0 wt % with respect to the weight other than the glass.

After that, a sample in accordance with condition 10 was produced in the same way as in Experimental Example 1. Then, the sample in accordance with the condition 10 was evaluated in the same way as in Experimental Example 1. The experimental condition and results are shown in Table 3.

TABLE 3

| Condition No. | Calcination Temperature | Setting mode | Composition | Area Ratio of Secondary Phase containing Alkali Metal with respect to Entire Field of View | The Number of Degraded Samples after Test |
|---|---|---|---|---|---|
| Condition 10 | 980° C. | Pile Mode | Powder | 84.3% | 0/72 |

It is determined from Table 3 that the area ratio of the secondary phase containing Li in the cross section of the dielectric ceramic is 84.3% in the case of the condition 10, i.e., firing together with the composition containing Li. In addition, it is determined that no sample degraded in terms of insulation resistance was generated after the PCBT test.

What is claimed is:

1. A method for producing a dielectric ceramic, the method comprising providing a compact containing a mixture of a first raw material powder comprising a powder of a dielectric ceramic component and a second raw material powder comprising an alkali metal element; and firing the compact and a second composition containing an alkali metal element at the same time.

2. The method for producing a dielectric ceramic according to claim 1, wherein the dielectric ceramic component is a perovskite represented by the general formula $ABO_3$ where A includes at least one of Ca and Sr, and B includes at least one of Zr and Ti).

3. The method for producing a dielectric ceramic according to claim 2, wherein the alkali metal element is Li.

4. The method for producing a dielectric ceramic according to claim 3, wherein the second composition is a powder containing the alkali metal element.

5. The method for producing a dielectric ceramic according to claim 3, wherein the second composition is a setter containing the alkali metal element.

6. The method for producing a dielectric ceramic according to claim 1, wherein the alkali metal element is Li.

7. The method for producing a dielectric ceramic according to claim 6, wherein the second composition is a powder containing the alkali metal element.

8. The method for producing a dielectric ceramic according to claim 6, wherein the second composition is a setter containing the alkali metal element.

9. The method for producing a dielectric ceramic according to claim 1, wherein the second raw material powder is an alkali metal-containing glass powder.

10. The dielectric ceramic according to claim 9, wherein the dielectric ceramic component is a perovskite compound represented by the general formula $ABO_3$ in which A includes at least one of Ca and Sr, and B includes at least one of Zr and Ti.

11. The dielectric ceramic according to claim 10, wherein the alkali metal element is Li.

12. A laminated ceramic capacitor comprising a plurality of stacked dielectric ceramic layers, at least two internal electrodes each of which is arranged between adjacent dielectric ceramic layers, and external electrodes electrically connected to the internal electrodes, wherein the dielectric ceramic layers comprise the dielectric ceramic according to claim 11.

13. A laminated ceramic capacitor according to claim 12 wherein internal electrodes comprise a base metal.

14. A laminated ceramic capacitor comprising a plurality of stacked dielectric ceramic layers, at least two internal electrodes each of which is arranged between adjacent dielectric ceramic layers, and external electrodes electrically connected to the internal electrodes, wherein the dielectric ceramic layers comprise the dielectric ceramic according to claim 10.

15. The method for producing a dielectric ceramic according to claim 1, further comprising forming a mixture of the first raw material powder and the second raw material powder into a compact.

16. The dielectric ceramic according to claim 15, wherein the alkali metal element is Li.

17. A laminated ceramic capacitor comprising a plurality of stacked dielectric ceramic layers, at least two internal electrodes each of which is arranged between adjacent dielectric ceramic layers, and external electrodes electrically connected to the internal electrodes, wherein the dielectric ceramic layers comprise the dielectric ceramic according to claim 16.

18. A dielectric ceramic comprising a main component comprising a dielectric ceramic component and an accessory component including an alkali metal element,
    a secondary phase containing an alkali metal element in the vicinity of a surface of the dielectric ceramic,
    wherein the area of the secondary phase containing the alkali metal element is 50% or more of a cross section the dielectric ceramic in the vicinity of the surface thereof.

19. A laminated ceramic capacitor comprising a plurality of stacked dielectric ceramic layers, at least two internal electrodes each of which is arranged between adjacent dielectric ceramic layers, and external electrodes electrically connected to the internal electrodes, wherein the dielectric ceramic layers comprise the dielectric ceramic according to claim 18.

20. A laminated ceramic capacitor according to claim 19 wherein internal electrodes comprise a base metal.

\* \* \* \* \*